United States Patent Office 3,454,605
Patented July 8, 1969

3,454,605
ISOMERIZATION OF THE 17-SIDE CHAIN ON 20-KETO STEROIDS
Bradford H. Walker, Kalamazoo, Mich., assignor to The Upjohn Company, Kalamazoo, Mich., a corporation of Delaware
No Drawing. Filed Dec. 20, 1967, Ser. No. 691,936
Int. Cl. C07c *169/00, 171/07*
U.S. Cl. 260—397.3
10 Claims

ABSTRACT OF THE DISCLOSURE

This invention relates to a process for the isomerization of the 17-side chain on a 20-keto steroid of the pregnane series of compounds, which comprises dissolving a small mole fraction of the steroid containing either or both the 17α and 17β acetyl side chain in an acidic or alkaline reaction medium in the presence of the undissolved crystalline matrix of the product. This matrix which is formed under the reaction conditions, present initially, or added as a seed crystal, allows the 17α and 17β isomers to interconvert and the 17β-acetyl isomer is crystallized out at the expense of the 17α isomer.

BACKGROUND OF THE INVENTION

The attaching bond between the 17-carbon atom and the acetyl group characterizing 20-keto compounds of the pregnane series of steroids has demonstrated an instability in acidic or alkaline media. This instability is substantial when the other substituent on the 17-carbon atom is hydrogen as in the case of progesterone.

This instability frequently results in lowered yields of desired product through formation of the undesired isomer during an acidic or alkaline treatment of the steroid, the product being a mixture of 17α and 17β isomers.

Heretofore, the principal means available to the production chemist for minimizing the formation of unwanted isomeric products was to adjust the reaction time temperature, catalyst, etc., to favor the desired result, none of which has proven consistently economical and effective.

BRIEF DESCRIPTION OF THE INVENTION

A wide number of 20-keto compounds of the pregnane series are subjected for substantial periods of time to treatment conditions while dissolved in acidic or alkaline media. The 17-acetyl side chain is sterically unstable during such conditions of treatment and migrates from the α-position to the β-position and vice versa; so that the reaction product is comprised of a mixture of the two steric isomers.

The normal configuration for 20-keto steroids is 17β. The 17α side chain is generated on occasion and is referred to as iso.

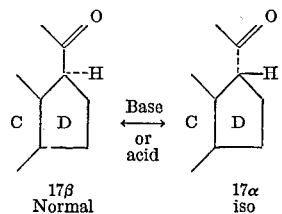

under conditions of steric instability, a mixture of these two isomers is generated, and the invention here deals with a method whereby the 17α component can be converted back to 17β by use of acidic or basic conditions. The 20-keto compounds produced in accordance with my invention hence possess the D-ring structure shown above.

Pregnane series is defined herein as those compounds containing the carbon atom skeleton:

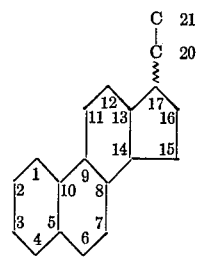

in which the carbon-carbon linkages can be either single or double bonded, and which can have carbon and/or other atoms as substituents attached to the carbon atom skeleton.

The complete molecular structure of my products is that of the 20-keto pregnane series:

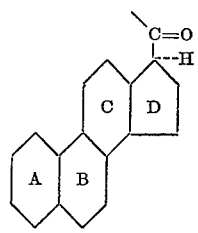

wherein the A-ring can have the 3-keto structure, Δ⁴-3-keto structure, the Δ¹,⁴-3-keto structure, the 3-hydroxy structure or the 3-acyloxy structure, the B-ring can possess substituents at the 6- and 7-positions such as lower alkyl, lower alkylene, hydroxyl or halogen, as well as 5-hydroxy substituents, the C-ring can have 9-, 11- and 12-substituents such as lower alkyl, hydroxyl or halogen, and the D-ring can have substituents at the 15- and 16-substituents such as lower alkyl, lower alkylene, hydroxyl or halogen. Moreover, vicinal or sterically near hydroxyl groups, i.e., glycols, can be ketalized. The A-B ring structure can be saturated or unsaturated as 4-dehydro, 1,4-bisdehydro, 1,4,6-dehydro and 4,6-dehydro, and the C-ring structure can be saturated or unsaturated as 9(11)-dehydro and 11-dehydro.

Such treatments leading to steric instability can be exemplified by the dehydration of nuclear hydroxylated compounds to introduced nuclear double bonds, the esterification of hydroxyl groups, and the hydrolysis of ester groups. The formation of the mixture of 17α and 17β stereoisomers frequently occurs along with the desired dehydration, esterification, hydrolysis of esters, e.g., carboxylic acid esters or the like. The formation of this mixture introduces yield-impairment and a number of difficult separation problems for the production chemist.

Heretofore, the methods for resolving such problems have been confined to selecting those reaction times, temperatures, and other conditions so as merely to minimize stereoisomerization, thus to keep at the lowest practical level the contamination of unwanted isomeric products.

As will be appreciated by those skilled in the art, the desired steric configuration of the 17-acetyl side chain is beta, i.e., corresponding to that of the more active steroid products.

I have discovered that when the 20-keto steroid being treated is maintained in contact with a matrix of undissolved 17β isomer, the latter tends to precipitate out by crystallization in preference to 17α isomer which, conversely, tends to remain in solution. Since the effect of the acidic or alkaline environment tends to reestablish the 17β isomer in solution, the net result in this system is substantially complete conversion to the 17β isomer. As will be appreciated by anyone skilled in the art, even initially undissolved 17α isomer present in the matrix tends to be dissolved and converted to the 17β isomer, whereafter it eventually returns to the undissolved matrix in the 17β isomeric form.

The system characterizing the process of the invention comprises a reaction medium of two phases, one comprising a solution of a 20-keto steroid in a non-reacting solvent in the presence of an acidic or an alkaline agent, and one comprising undissolved 20-keto steroid.

According to my discovery, I can thus accomplish the conversion of a 20-keto compound containing a substantial proportion of 17α-acetyl isomer to the substantially complete 17β-acetyl isomer by subjecting it to the kind of system heretofore described.

According to my discovery, I can likewise effect the production of 17β isomer to the substantial exclusion of the 17α isomer in those chemical conversions which are carried out in an acidic or alkaline environment by selecting or modifying the environment so as to provide the crystalline matrix containing the undissolved 17β isomer of the product. Further, according to my invention the acidic conditions capable of accomplishing the conversion to 17β isomers are in the range pH 5 to 1 and below. The alkaline conditions which effect the isomer described above lies in the range pH 8 to 12 and above. Any acidic or alkaline agency capable of producing the above noted ranges of pH can be used. As will be appreciated by those skilled in the art, furthermore, artificial or automatic means for maintaining the pH can be employed, as by the incremental addition of acid or alkali in response to changes of pH of the reaction medium.

The following examples include procedures for accomplishing 17α and 17β equilibration by acidic or basic treatment with or without other reactions occurring on the steroid molecule. Typical examples of the former are the conversion of isoprogesterone to progesterone, 11-ketoisoprogesterone to 11-ketoprogesterone, 11α-hydroxyisoprogesterone to 11α - hydroxyprogesterone, 11α - acetoxyisoprogesterone to 11α - acetoxyprogesterone, 6α - methyl - 11 - ketoisoprogesterone to 6α - methyl - 11 - ketoprogesterone, 6α - methylisoprogesterone to 6α - methylprogesterone, 6α - fluoro - 11 - ketoisoprogesterone to 6α - fluoro - 11 - ketoprogesterone and 16α - methylisoprogesterone to 16α - methylprogesterone. Examples of the latter are the conversion of 5α-hydroxy-6β-methylisopregnane - 3,11,20 - trione to 6α - methyl - 11 - ketoprogesterone by acid or alkaline treatment and 11β-hydroxy - 9α - haloisoprogesterone to 9,11β - oxidoprogesterone with base.

Of significant practical importance is a further application of my discovery in the carrying out of acidic or basic treatment of 20-keto steroids so as to suppress entirely the effective formation of unwanted 17α isomer. As will be appreciated by those skilled in the art, there are numerous such conversions which heretofore have resulted in product contaminated with the 17α isomer. The following likewise include examples of this further application.

In general, for the alkaline type of conversion I can use sodium hydroxide, potassium hydroxide, ammonium hydroxide, sodium carbonate, potassium carbonate, ammonium carbonate and the like, to make up a predominantly aqueous solution. The solvent can be any that is relatively inert to the acid or base while dissolving it and in which the 20-keto compound is only slightly soluble. Examples are ethylene glycol, glycol water and more preferably water plus an organic co-solvent to help control the degree of solution of the 20-keto compound. It is also possible to use a predominantly organic base such as sodium or potassium alkoxide in an alcohol for the isomerization, however, the solubility of steroids in this medium is higher than in those which are highly aqueous. Preferably the co-solvent is one which does not react with the base and is miscible with water. The quantity of co-solvent must be controlled, usually in smaller proportions than the water, because its presence controls the solubilization of the 20-keto compound. The system, according to my invention, requires a substantial proportion of 20-keto compound left undissolved, less than 20% of that dissolved at room temperature, preferably from 0.1% to 5% under reaction conditions. Examples of co-solvents are methanol (preferred), ethanol, propanol polyols, dioxane, tetrahydrofuran, dimethyl sulfoxide, hexamethyl phosphoramide and the like.

The aqueous solution of base containing the co-solvent is preferably purged with nitrogen and the solid 20-keto compound added. After addition, preferably with agitation, the resulting reaction mixture comprises an undissolved phase and a solution phase.

In this system, the 17α isomer, no matter what its source, is converted to the 17β isomer in the overall reaction, the solid phase eventually arriving at a substantially pure state of 17β isomer. The source of 17α epimer can be from the matrix, i.e., having been present in the original 20-keto compound, or it can be produced in situ by the effect of the reaction medium on the 20-keto steroid in solution. As also explained in the previous section, the effect of the reaction medium on the 20-keto compound in solution can result in a concomitant chemical reaction which will produce a prooprtion of 17α epimer.

Preferably the reaction is allowed to proceed in an inert atmosphere and will proceed at mild (room) temperature up to the boiling point of the mixture. The higher the temperature, the more soluble the 20-keto product and the more rapidly the isomerization occurs. The quantity of co-solvent can be varied to control the amount of 20-keto steroid in solution at any desired reaction temperature.

In some instances, e.g., progesterone:isoprogesterone, the low melting point of the 20-keto compound tends to result in emulsions on mixing at high temperatures. In such cases an initial isomerization can be applied by heating at reflux until equilibrium is established between the quantities of progesterone and isoprogesterone that are present. After this period, the temperature is lowered to about 70° C., whereupon crystallization occurs and the isomerization equilibration is permitted to proceed. Alternatively, the slurry of reaction solvent and progesterone can be made up at a temperature below the melting point of the 17β epimer, e.g., in the case of progesterone 70° C., and this temperature maintained throughout the entire process with satisfactory isomerization results, i.e., formation of substantially pure progesterone from mixtures containing isoprogesterone. More time is required in these cases if the isomerization period at reflux is omitted.

The progress of the isomerization reaction can be followed by nuclear magnetic resonance spectroscopy or by vapor phase chromatography.

Isomerization using an acidic medium is analogous to that using an alkaline medium. Selection of the co-solvent is guided by the same reasoning as for the alkaline reaction, i.e., the co-solvent should not substantially react with the acid. As in the alkaline method, methanol is a preferred co-solvent for the acid isomerization. The concentration of acid should be about 2 N for the strong acids such as hydrochloric, phosphoric, sulfuric, perchloric, hydrobromic and like Bronsted acids. Lewis acids may also be used such as ferric halides, zinc halides and the like. The range of normality for the isomerization can be 0.5 N to 6 N though isomerization can be effected at higher or lower concentrations.

The selection of the concentration of acid or alkaline reaction media will depend somewhat upon the 20-keto compound being treated. Extreme reaction conditions, naturally, are to be avoided if they would lead to undesired side reactions such as dehydrohalogenation, dehydration, hydrolysis and the like. Thus alkaline conditions are preferred when isomerizing 11α-hydroxy isoprogesterone, where dehydration and formation of Δ$^{9,11}$ products would be a potential problem using acids. Alternatively, acidic isomerizations require the use of glass reactors for long reaction times. Basic isomerizations with glass reactors causes corrosion of the glass.

This application of the invention is illustrated in Examples 2, 3, 7 and 8 which follow.

In Examples 2 and 3, there is illustrated the alkaline hydrolysis of a solution of a 20-keto compound containing an ester group, to produce the 20-keto free hydroxyl compound as an oily or crystalline 17 epimeric mixture. This mixture of 17α and 17β steroids after seeding or cooling to obtain a crystalline phase is heated under reflux as a two phase reaction mixture until the free hydroxyl compound possessing the 17β configuration is generated from the mixture of solids and solutions, the product of total hydrolysis and equilibration consists essentially of the 17β isomer, formed at the expense of the 17α isomer.

In Example 2 the matrix compound is added subsequent to the initial period of hydrolysis (which produced 22% of the 17α isomer) and the basic treatment is thereafter continued. In Example 3, the hydrolysis occurred again in homogeneous solution to generate an oil which crystallized spontaneously and served as a crystallization matrix for the preferential crystallization of the desired 17β isomer.

In Examples 7 and 8 the base and acid dehydration, respectively, is carried out on a 20-keto compound containing a hydroxyl group to produce an added double bond in the product. It is carried out in the presence of a substantial proportion of undissolved 17β isomer, in this case the product precipitates spontaneously or on a matrix of the starting material. The undissolved starting material not only entered into the reaction and became dehydrated, but could also have served as a crystallization matrix for the preferential crystallization of the desired 17β isomer.

Examples 7 and 8 show that only a small portion of the reaction mixture need be soluble at any one time for complete reaction to the desired 17β dehydration product to be obtained.

Example 1

A mixture of stereoisomers of 11-keto progesterone containing about 30% 11-keto isoprogesterone was made up into a two phase slurry with aqueous ethanolic sodium hydroxide and subjected to heating. The overall content of the iso component (17α) decreased steadily and the reaction was stopped when it reached 3.5%. Recrystallization produced a product composed of nearly normal quality 11-keto progesterone. The reaction can be repeated with analogous results using methanolic sodium hydroxide, ethanolic potassium hydroxide or aqueous ethanolic hydrogen chloride as the slurry medium.

Example 2

A solution of 4 g. of 11α-hydroxy progesterone hemiphthalate in 30 ml. of 2 N sodium hydroxide was heated under reflux for one hour. The oily product phase, at the end of this reaction period, assayed 22% 11α-hydroxy isoprogesterone (the 17α isomer) and 78% 11α-hydroxy progesterone (the 17β isomer) by VPC (vapor phase chromatographic) analysis. To the reaction mixture was added about 10 mg. of solid 11α-hydroxy progesterone and reflux was carried out for two hours. During this period, extensive crystallization occurred, and VPC analysis showed a 17β isomer content (i.e., 11α-hydroxy progesterone) of 89.2%. After overnight reflux the β isomer constituted 96.7% of the product.

Example 3

To 25 g. of 11α-hydroxy progesterone phthalate was added 188 ml. of 2 N NaOH. After 18 hours reflux during which time a second phase was generated and spontaneously crystallized, the product was cooled, filtered, washed with water and dried to yield 17.35 g. VPC analysis showed only 11α-hydroxy progesterone. The product melted 158.5–165° C., [α]$_D$ +170° (CHCl$_3$) usual constants are M.P. of about 160° C., [α]$_D$ 179±5° (CHCl$_3$).

Example 4

To 3.5 g. of a mixture of 30% 11-keto isoprogesterone and 70% 11-keto progesterone was added 100 ml. of 2 N hydrochloric acid and 20 ml. of methanol. After 36 hours at reflux under nitrogen the NMR (nuclear magnetic resonance) spectrum and a VPC analysis indicated very little residual iso compound. The reaction mixture was cooled in an ice bath, filtered, washed well with water and recrystallized from methanol-water to give after filtration and drying 2.7 g. of 11-keto progesterone melting 167–172° C., [α]$_D$ +269° (CHCl$_3$). The NMR spectrum was normal for 11-keto progesterone and VPC analysis indicated only about 3% residual iso 11-keto progesterone.

Example 5

To 5.0 g. of a mixture of 40% isoprogesterone and 60% progesterone was added 100 ml. of 2 N hydrochloric acid and 20 ml. of methanol. The reaction mixture was heated at reflux overnight under nitrogen. It was cooled to room temperature and then heated for several days at 70° C. An NMR spectrum of the product showed essentially complete conversion of the iso to normal. The product was filtered, washed with water, and recrystallized from methanol to give 2.75 g. of progesterone melting at 121–128.5° C., [α]$_D$ +177° (dioxane). Thin layer chromatography showed only traces of impurities.

Example 6

A 2.5 kg. slurry containing about 50% 6α-methyl-11-keto isoprogesterone (and 50% 6α-methyl-11-keto progesterone) was prepared in 835 ml. of methanol, and 4165 ml. of 11.25% aqueous potassium hydroxide solution. The slurry was stirred at reflux under nitrogen. A sample of the precipitated solids indicated little residual of the 17α isomer by NMR. The crude yield was in the range of 90–95%.

The precipitated solids were collected by vacuum filtration, washed thoroughly with water and diluted hydrochloric acid, recrystallized first from methanol, and finally from ethyl acetate. The product had the following analysis: M.P., 165.8–169.0° C., [α]$_D$ +252° (CHCl$_3$).

*Analysis.*—Calcd. for $C_{22}H_{30}O_3$ (342.46): C, 77.15; H, 8.83. Found: C, 77.13; H, 8.87.

$$\lambda_{max.}^{EtOH}: 237.5, \epsilon\ 15,150$$

NMR normal for pure 17β isomer.

Example 7

A reaction slurry was made up of 50 g. of 5α-hydroxy-6β-methyl-pregnane-3,11,20-trione, 91.5 ml. of 12.25% aqueous sodium hydroxide and 8.5 ml. of methanol and stirred for a period of 24 hours at reflux under nitrogen. A sample of solids indicated 97% conversion to 6α-methyl-4-pregnene-3,11,20-trione with substantially none of the 17α isomer present. The crude yield was in the range of 90–95%. The solids were collected by vacuum filtration, washed with water and dilute hydrochloric acid, vacuum dried, and recrystallized from ethyl acetate. This product had the following analysis: M.P., 162.8–165.0° C., [α]$_D$ +252° (CHCl$_3$).

*Analysis.*—Calcd. for $C_{22}H_{30}O_3$: C, 77.15; H, 8.83. Found: C, 77.15; H, 8.85. NMR normal for pure 17β isomer.

Example 8

A slurry mixture of 50 g. of the starting material of Example 6, 450 ml. of 2 N hydrochloric acid, and 50 ml. of methanol was stirred at reflux under nitrogen for a period of 24 hours. A sample of the solids showed 98% conversion to 6α-methyl-4-pregnene-3,11,20-trione with substantially none of the 17α isomer being present. The crude yield was in the the range of 90–95%. An analytical sample, prepared as in Example 6, had the following analysis: M.P., 164.8–170.0° C., [α]$_D$ +252° (CHCl$_3$).

*Analysis.*—Calcd. for $C_{22}H_{30}O_3$: C, 77.15; H, 8.83. Found: C, 76.90; H, 8.70. NMR normal for pure 17β isomer.

Example 9 (comparative)

When Examples 7 and 8 are carried out in a totally dissolved state, the resulting product is composed of 15–30% of the 17α isomer, which ratio does not change substantially on prolonged heating.

I claim:

1. In a process for treating a 20-keto compound of the pregnane series in a reaction medium of the group consisting of acidic reaction media and alkaline reaction media, wherein the stereoconfiguration of the 17-acetyl side chain of said 20-keto steroid is rendered sterically unstable, the improvement which comprises carrying out the treatment in the presence of an undissolved matrix comprised of the 17β-stereo isomer of said 20-keto steroid, or conversion product, whereby the 17β isomer of said 20-keto steroid is formed in the medium and separates from the medium by crystallization.

2. Process of claim 1 in which the 20-keto steroid is 11-keto progesterone.

3. Process of claim 1 in which the 20-keto steroid is 11α-hydroxy progesterone.

4. Process of claim 1 in which the 20-keto steroid is progesterone.

5. Process of claim 1 in which the 20-keto steroid is pregnenolone.

6. In the process comprising the alkaline hydrolysis of a starting 20-keto compound of the pregnane series containing an ester group to produce a final 20-keto free hydroxyl compound of the pregnane series by heating said starting compound in an alkaline medium, the improvement which comprises carrying out said heating in the presence of a substantial proportion of undissolved final compound possessing the 17β stereoconfiguration, thus to favor the formation of 17β isomer in the product.

7. In the process comprising the dehydration of a starting 20-keto compound of the pregnane series containing a hydroxyl group to produce a final 20-keto compound product having an added double bond by heating a solution of the former in a medium of the group consisting of acidic or alkaline, the improvement which comprises carrying out said heating in the presence of a small amount of the 17β product to act as a crystal matrix whereupon a substantial proportion of undissolved product possessing the 17β stereoconfiguration precipitates on the matrix in crystalline form, thus favoring the formation of 17β isomer in the product.

8. The process according to claim 7 wherein the starting compound is an ester of 11α-hydroxy progesterone.

9. The process according to claim 7 wherein the starting compound is 11α-hydroxy progesterone phthalate.

10. The process according to claim 7 wherein the starting compound is 5α-hydroxy-6β-methyl-pregnane-3,11,20-trione.

No references cited.

HENRY A. FRENCH, *Primary Examiner.*

U.S. Cl. X.R.

260—397.45